United States Patent
Imahori et al.

(10) Patent No.: US 8,035,907 B2
(45) Date of Patent: Oct. 11, 2011

(54) IMAGE CAPTURING DEVICE

(75) Inventors: Yoshimasa Imahori, Osaka (JP); Takashi Toyoda, Osaka (JP); Yoshizumi Nakao, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 372 days.

(21) Appl. No.: 12/426,744

(22) Filed: Apr. 20, 2009

(65) Prior Publication Data

US 2009/0262442 A1 Oct. 22, 2009

(30) Foreign Application Priority Data

Apr. 21, 2008 (JP) ................................. 2008-110280

(51) Int. Cl.
*G02B 5/04* (2006.01)
(52) U.S. Cl. ........................................................ 359/831
(58) Field of Classification Search .................. 359/696, 359/704, 819–823, 831–837
See application file for complete search history.

(56) References Cited

U.S. PATENT DOCUMENTS

2002/0191307 A1* 12/2002 Nakamura .................... 359/698

FOREIGN PATENT DOCUMENTS

JP 2007-041121 2/2007

* cited by examiner

*Primary Examiner* — Euncha Cherry
(74) *Attorney, Agent, or Firm* — Pillsbury Winthrop Shaw Pittman, LLP

(57) ABSTRACT

An image capturing device includes an image capturing unit, a fitting member, and a cover member. The image capturing unit captures a plurality of unit images having parallax by using a lens array having a plurality of unit lenses, and a prism. The fitting member is provided with a mounting portion upon which said prism is mounted. The cover member is put onto the fitting member from its side which faces the mounting portion. The mounting portion has a shape which, in the state in which the prism is mounted, grips two contiguous faces of the prism. And the cover member has a pair of claws which, when the cover member is put onto the fitting member, squeeze two contiguous faces of the prism which is mounted to the mounting portion.

4 Claims, 12 Drawing Sheets

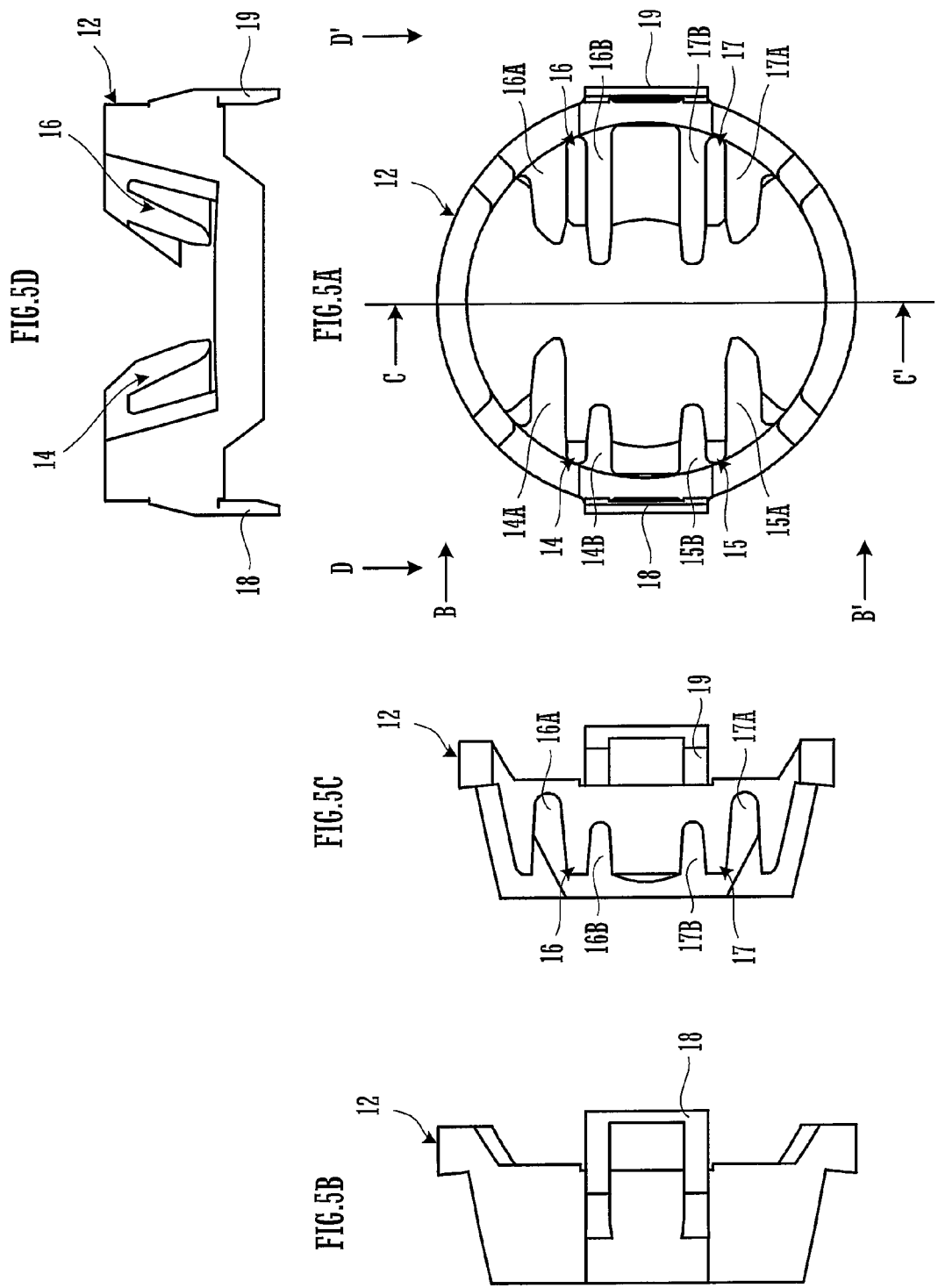

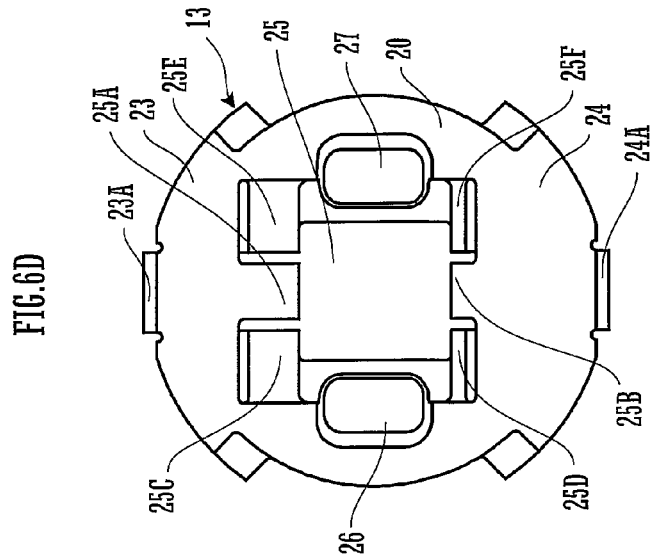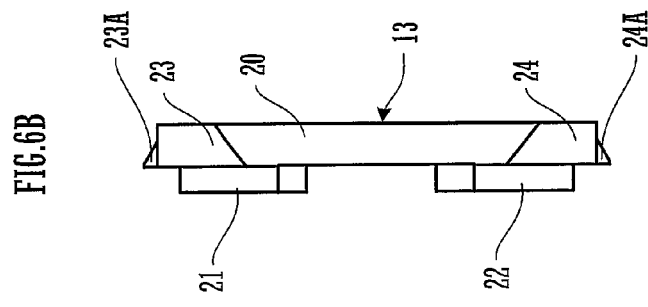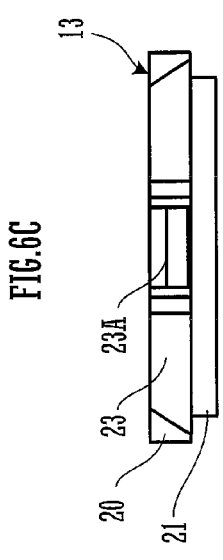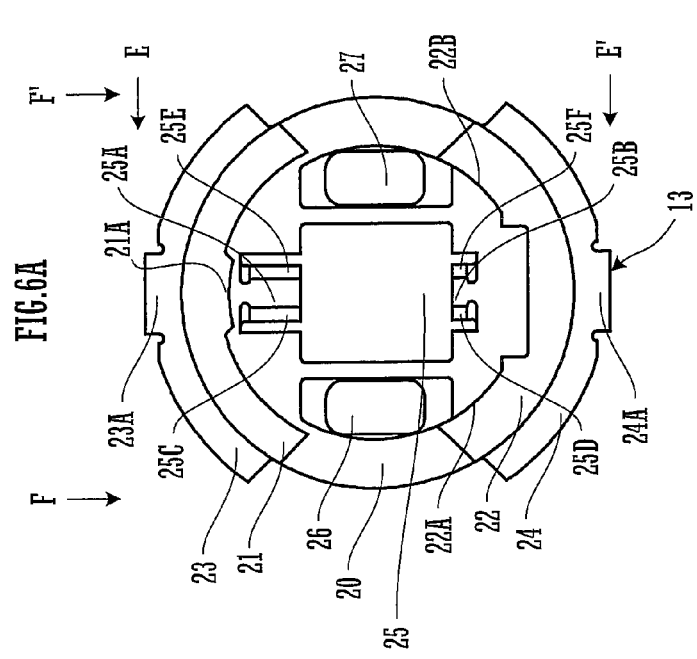

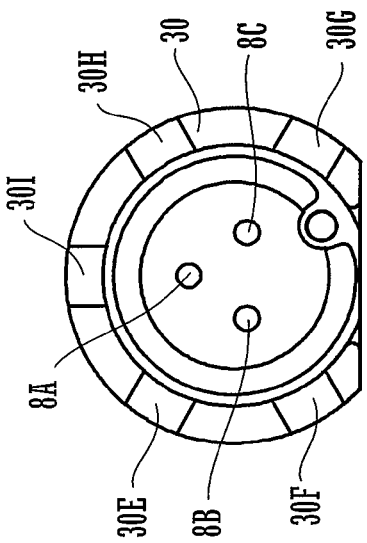
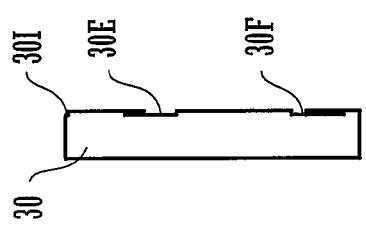
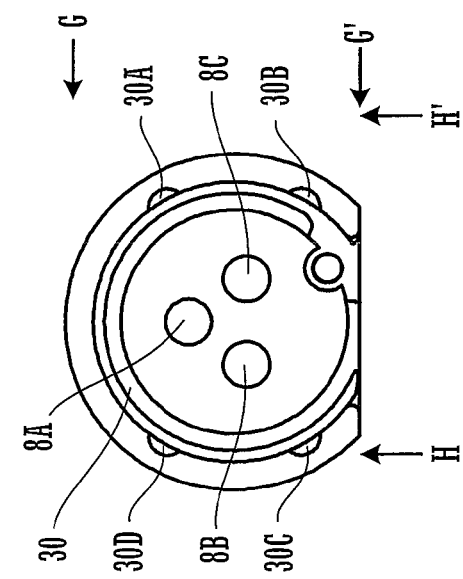

IMAGE CAPTURING DEVICE

CROSS REFERENCE

This Nonprovisional application claims priority under 35 U.S.C. §119(a) on Patent Application No. 2008-110280 filed in Japan on Apr. 21, 2008, the entire contents of which are hereby incorporated by reference.

BACKGROUND OF THE INVENTION

The present invention relates to an image capturing device which captures a plurality of unit images having parallax by using prisms.

In the prior art, there is a per se known type of image capturing device in which a plurality of unit images having parallax are captured by using a lens array which has a plurality of unit lenses and at least a prism. With this type of image capturing device, a light beam which is incident upon the prism and is refracted or reflected, and a light beam which is not incident upon the prism, are each incident upon a corresponding one of the unit lenses. Each of the unit lenses projects a light beam upon a corresponding region of a light reception element. And this image capturing device detects the parallax between the unit images which are obtained from the light beams. Then, the image capturing device generates an image signal corresponding to a panorama image by combining together the compound images on the basis of the parallax which has been detected.

With this type of image capturing device, a prism fitting construction in which the prism is pressed into a lens barrel to which the lens is fitted is disclosed in Japanese Laid-Open Patent Publication 2007-041121. With this prism fitting construction, a trigger lever is provided within the lens barrel, and a pressure projection is provided at the tip end portion of this trigger lever. And, when the prism is pressed into the lens barrel, this pressure projection presses against one face of the prism, and receiving surfaces provided within the lens barrel press against both of its other two faces. By doing this, the prism is fixed within the lens barrel.

However, with this prism fitting construction disclosed in Japanese Laid-Open Patent Publication 2007-041121, it is necessary to provide the trigger lever and the pressure projection within the lens barrel. Due to this, the manufacturing cost of the image capturing device is increased, because the number of components is increased and the manufacturing process becomes complicated.

Thus the object of the present invention is to provide an image capturing device which can prevent increase of the cost of manufacture.

SUMMARY OF THE INVENTION

The image capturing device according to the present invention includes an image capturing unit, a fitting member, and a cover member. The image capturing unit captures a plurality of unit images having parallax, by using a lens array having a plurality of unit lenses, and at least a prism. The fitting member is provided with a mounting portion to which the prism is mounted. And the cover member is put onto the fitting member from its side which faces the mounting portion.

In the state with the prism mounted, the mounting portion grips two contiguous faces of the prism. Moreover, the cover member has a pair of claws which, when the cover member is put onto the fitting member, squeeze two contiguous faces of the prism which is mounted upon the mounting portion.

According to the structure described above, the prism is held by the mounting portion of the fitting member and by the pair of claws which are provided to the cover member. Due to this, the prism is fixed by this simple structure in which the cover member is put onto the fitting member.

BRIEF DESCRIPTION OF THE DRAWINGS

FIGS. 5(A) through 5(D) are an elevation view, side views, and a sectional view of a cover member;

FIGS. 6(A) through 6(D) are a rear view, side views, and an elevation view of a fitting member;

FIGS. 7(A) through 7(D) are a rear view, side views, and an elevation view of a lens array;

DETAILED DESCRIPTION OF THE INVENTION

Figure 1:
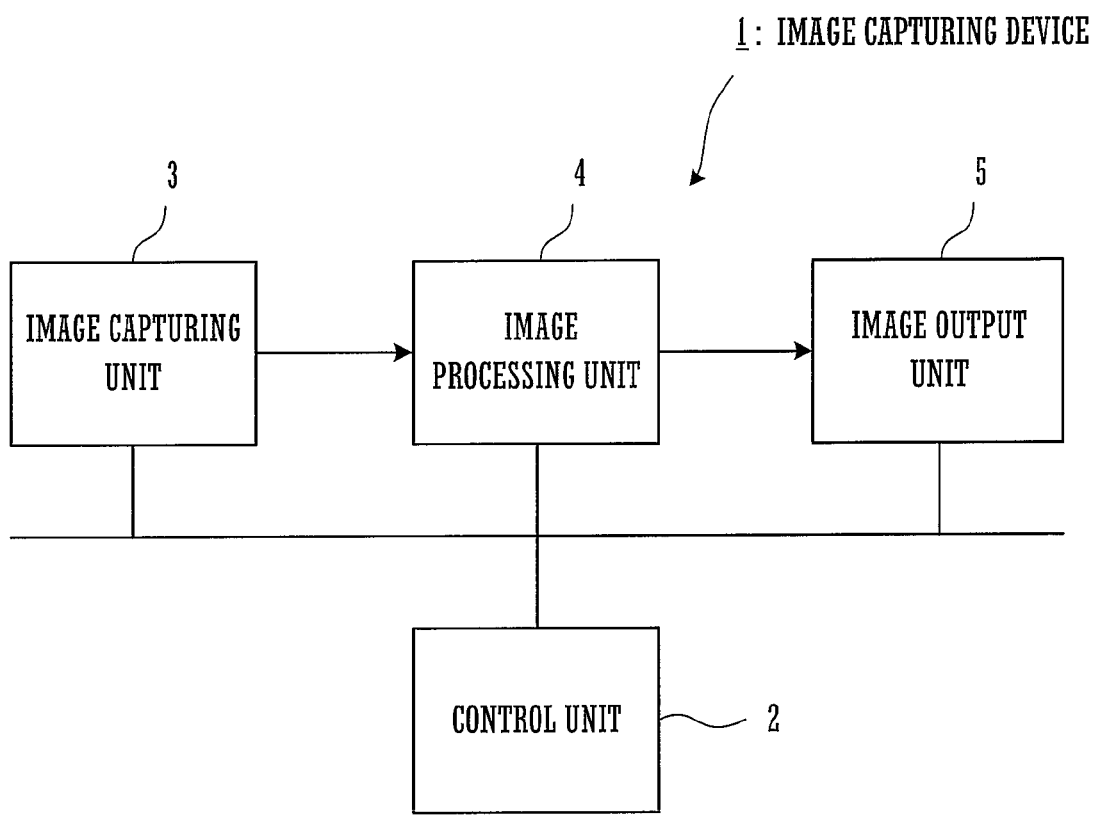
FIG. 1 is a block diagram showing the structure of the main portions of a compound image capturing device.

FIG. 1 is a block diagram showing the structure of the main portions of a compound image capturing device to which the present invention has been applied. This compound image capturing device 1 comprises a control unit 2, an image capturing unit 3, an image processing unit 4, and an image output unit 5. The compound image capturing device 1 is a compound image capturing device which captures a panorama image. And the compound image capturing device 1 creates a single panorama image by combining images from a plurality of image regions upon which images of the photographic subject have been projected. The details of this capturing of a panorama image will be described hereinafter.

The control unit 2 controls the operation of the main sections of the main body of this compound image capturing device 1.

Figure 2:
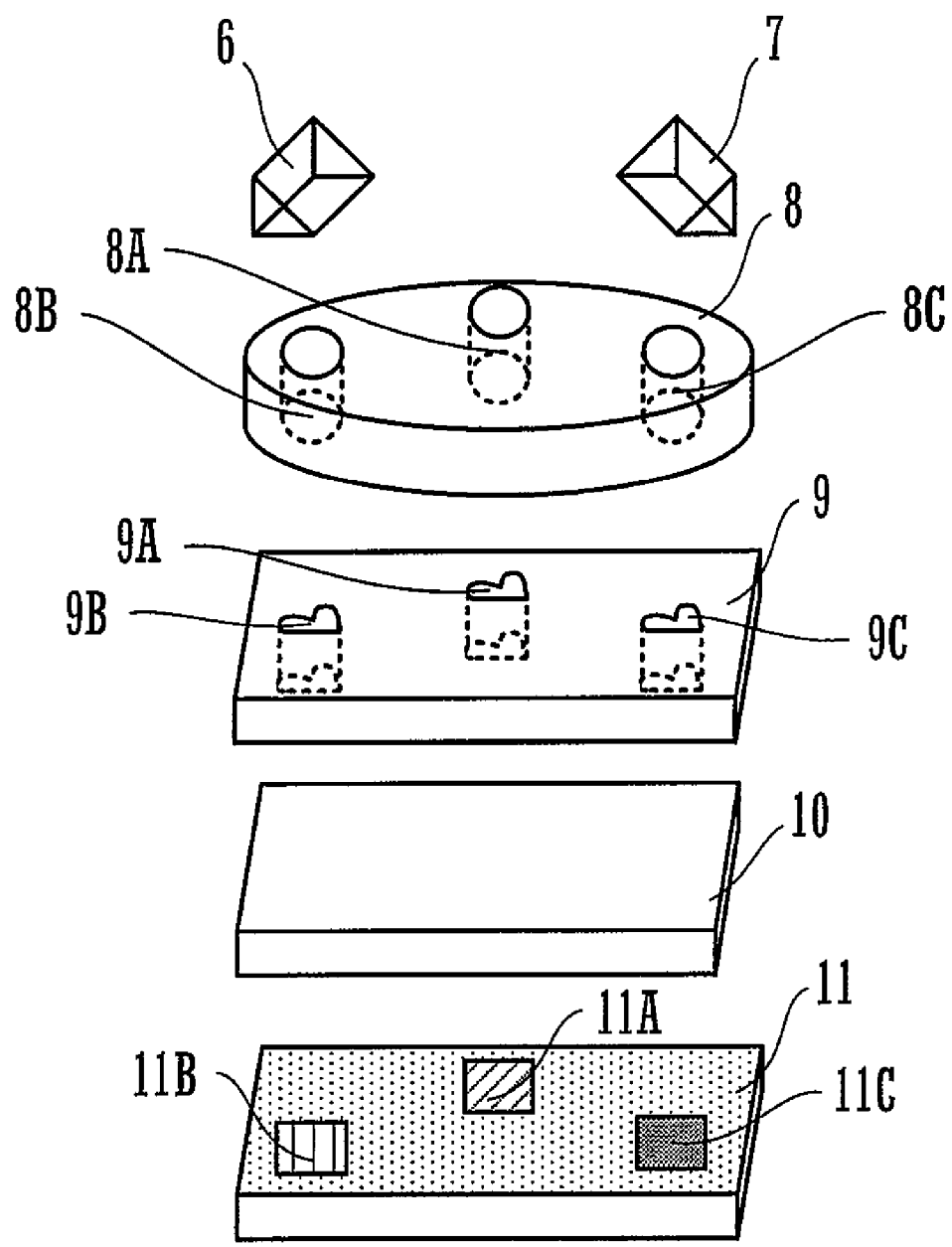
FIG. 2 is an exploded perspective view showing the structure of an image capturing unit.

FIG. 2 is an exploded perspective view showing the structure of the image capturing unit 3. This image capturing unit 3 comprises prisms 6 and 7, a lens array 8, a partition wall 9, an infrared ray cutout filter 10 (hereinafter termed the "IRCF 10"), and a light reception element 11.

Figure 3:
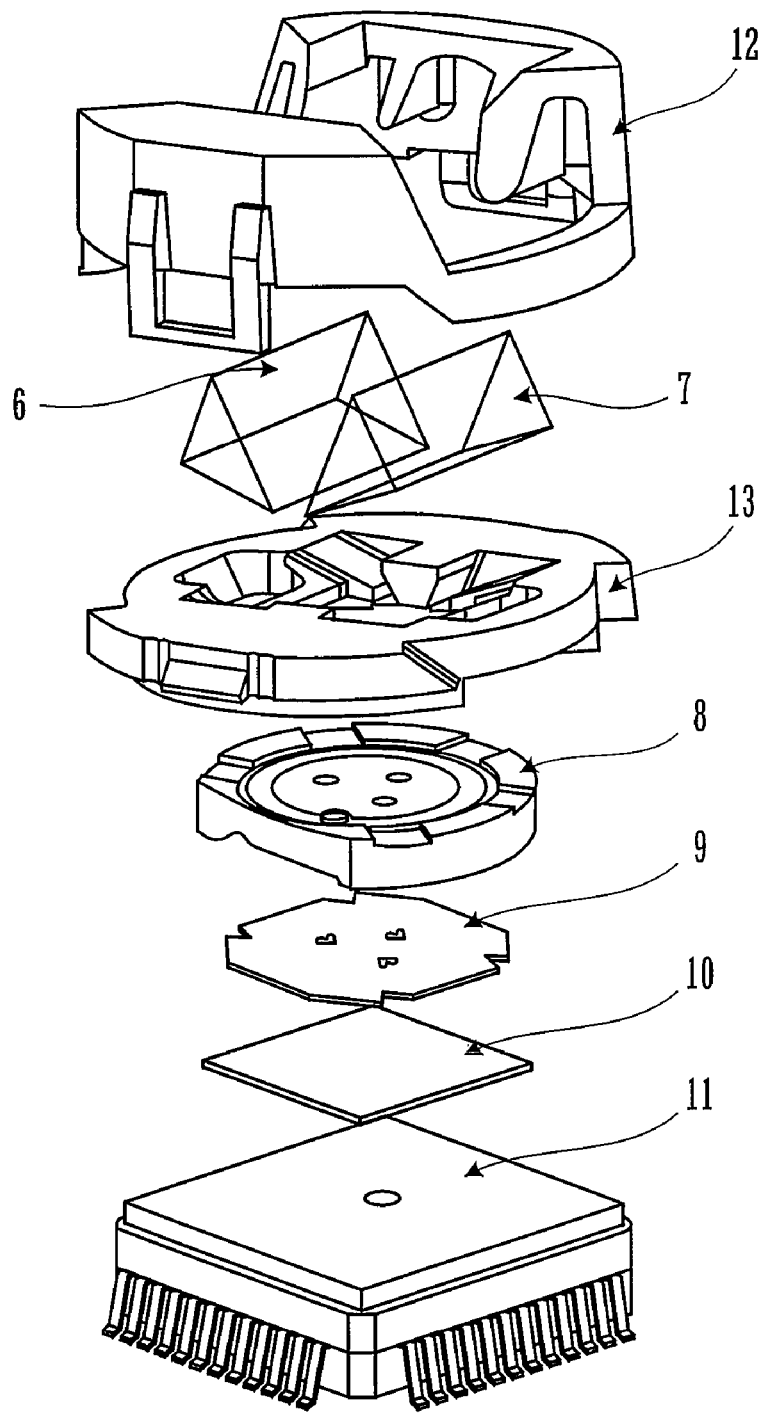
FIG. 3 is an exploded perspective view showing the structure of an image capturing unit.

The prisms 6 and 7 are mounted upon a fitting member 13 (refer to FIG. 3). These prisms 6 and 7 refract or reflect light beams which are incident into the image capturing unit 3. The prism 6 is positioned so as to face the unit lens 8B with the fitting member 13 between them. And the prism 7 is positioned so as to face the unit lens 8C with the fitting member 13 between them.

In the following explanation, a light beam which has not passed through either of the prisms 6 and 7 will be termed the "first light beam", a light beam which has been incident into the prism 6 and has been refracted or reflected will be termed the "second light beam", and a light beam which has been incident into the prism 7 and has been refracted or reflected will be termed the "third light beam".

The lens array 8 has a plurality of unit lenses 8A through 8C. The lens array 8 is also called compound lens. The unit lenses 8A through 8C are also called facet lenses. This lens array 8 is inserted into the fitting member 13 which will be described hereinafter, and is then bonded thereto. In FIG. 2, a lens array 8 is shown which has a total of three unit lenses 8A through 8C. The prism 6 is held by the fitting member 13 in a position to oppose the unit lens 8B. Moreover, the prism 7 is held by the fitting member 13 in a position to oppose the unit lens 8C. The first light beam is incident into the unit lens 8A. Moreover, the second light beam is incident into the unit lens 8B. Similarly, the third light beam is incident into the unit lens 8C. The details of this lens array 8 will be described hereinafter.

The light reception element 11 is arranged so as to oppose the lens array 8. Between the lens array 8 and the light reception element 11, the partition wall 9 and the IRCF 10 are disposed so as to be arranged in that order.

It should be understood that, during implementation, it would also be acceptable for the positions of the partition wall and the infrared ray cutout filter to be reversed. In other words, the infrared ray cutout filter and the partition wall might be arranged in that order between the lens array and the light reception element.

The partition wall 9 is a plate shaped optical dividing wall, and provided with opening portions 9A through 9C are provided therein. This partition wall 9 is attached to the lens array 8. Due to this, it is indirectly attached to the fitting member 13. Moreover, these opening portions 9A through 9C are provided in positions which oppose the unit lenses 8A through 8C, in the state in which the partition wall 9 is attached to the lens array 8. The first beam which is emitted from the unit lens 8A is incident into the opening portion 9A. And the second beam which is emitted from the unit lens 8B is incident into the opening portion 9B. Moreover, the third beam which is emitted from the unit lens 8C is incident into the opening portion 9C.

The partition wall 9 delimits images of the photographic subject which are projected by the unit lenses 8A through 8C. In other words, the partition wall 9 delimits image capture regions upon the light reception element 11 upon which images of the photographic subject are projected by the unit lenses 8A through 8C. Each of the first through the third light beams which passes through its respective opening portion 9A through 9C projects a unit image of the photographic subject upon a corresponding image capturing region of the light reception element 11. In detail, the first light beam which is emitted from the opening portion 9A is projected upon an image region 11A. And the second light beam which is emitted from the opening portion 9B is projected upon an image region 11B. Moreover, the third light beam which is emitted from the opening portion 9C is projected upon an image region 11C.

The partition wall 9 prevents the first through the third light beams from being projected upon any regions of the light reception element 11 other than those to which they respectively correspond, as detailed above. Moreover, the partition wall 9 functions as a shield, and intercepts any light other than these light beams from the unit lenses 8A through 8C. Due to this, the partition wall 9 prevents any light rays other than those from the unit lenses 8A through 8C from being projected upon the light reception element 11. The details of the partition wall 9 will be described hereinafter.

The IRCF 10 is a rectangular plate. This IRCF 10 intercepts infrared radiation included in the first through the third light beams. The details of this IRCF 10 will be explained hereinafter.

The image processing unit 4 creates a panorama image of the photographic subject by performing combination processing upon the plurality of unit images captured by the image capturing unit 3, to produce a single image.

And the image output unit 5 has an interface which connects to an external device such as a display device, a printing device, or the like. This image output unit 5 outputs a signal corresponding to the panorama image which has been created by the image processing unit 4 to this external device.

It should be understood that it would also be acceptable to arrange for the image output unit to include a display unit, and to display the panorama image which has been created by the image processing unit 4 upon this display unit.

Next, the capturing of a panorama image by this compound image capturing device 1 will be explained.

When a shutter not shown in the figures is actuated, the compound image capturing device 1 captures an image of the photographic subject which is projected upon the light reception element 11 of the image capturing unit 3. With the compound image capturing device 1 according to this embodiment, for example, the three unit images which are projected upon the light reception element 11 may be captured as a compound image by the per se known rolling shutter method.

The light rays which are incident upon the image capturing unit 3 are separated into three light beams, i.e. into the first through the third light beams described above. Each of these first through third light beams corresponds to its respective one of the unit lenses 8A through 8C and its respective one of the opening portions 9A through 9C. Light rays which are not incident upon any of the opening portions 9A through 9C do not exert any influence upon the light reception element 11, since they are intercepted by the partition wall 9 and thus do not reach the light reception element 11.

The image processing unit 4 combines the plurality of unit images which are captured by the image capturing unit 3 into a single image, and performs processing to create a panorama image. And the image output unit 5 outputs a signal corresponding to this panorama image which has been produced by the image processing unit by combination.

Next, the various structures will be explained.

FIG. 3 is an exploded perspective view showing the external appearance of the various structures of the cover member 12, the prisms 6 and 7, the fitting member 13, the lens array 8, the separation member 9, the IRCF 10, and the light reception element 11. The prisms 6 and 7 are fixed by the cover member 12 and the fitting member 13 which will be described hereinafter. Moreover, the lens array 8 is fixed to the fitting member 13 which will be described hereinafter. The light reception element 11 is arranged so as to face the lens array 8. The separation member 9 is disposed between the lens array 8 and the light reception element 11. And the IRCF 10 is disposed between the separation member 9 and the light reception element 11.

Next the prism 6 will be explained. Since the prism 7 has the same structure as the prism 6, detailed explanation thereof will be omitted.

Figure 4A:
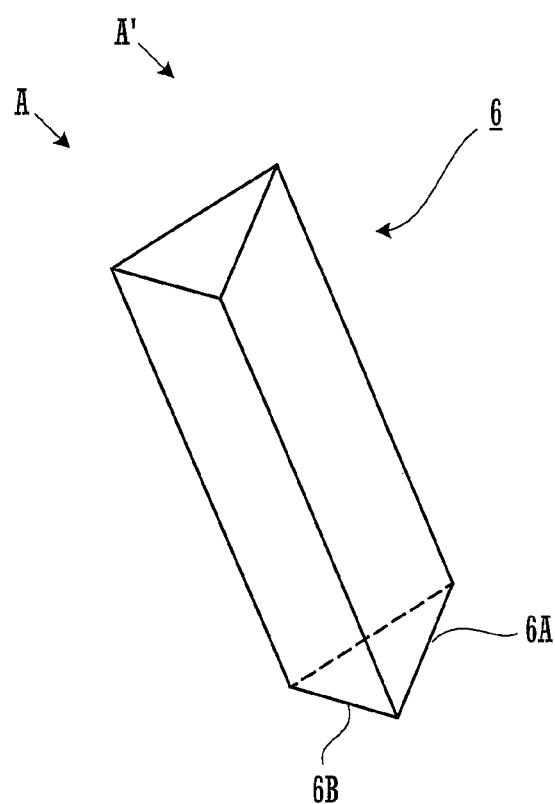
FIGS. 4(A) through 4(C) are an external perspective view, a side view, and a rear view of a prism.
Figure 4B:
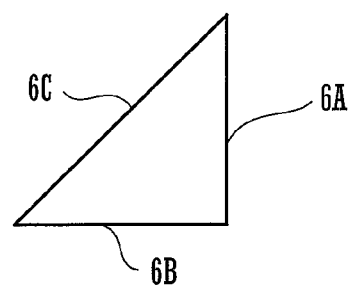
Figure 4C:
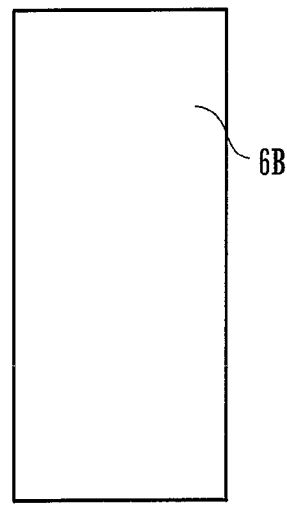

FIG. 4(A) is an external perspective view of the prism 6. FIG. 4(B) is a side view of the prism 6 as seen in the direction A-A'. And FIG. 4(C) is a rear view of the prism 6.

The prism 6 is made from glass. This prism 6 is a triangular prism having a right angled isosceles triangular shape, with its incident face 6A and its emission face 6B subtending a right angle. A reflective surface 6C made with an aluminum coating is formed upon the sloping face of the prism 6. The surface of the prism 6 is divided into a transparent region through which light can pass, and a non-transparent region through which light cannot pass. This non-transparent region of the prism 6 is fitted to the cover member 12 and the fitting member 13 which will be described hereinafter.

It should be understood that the prism 6 could also be made from some other material. Moreover, the prism 6 could also be of some other shape.

Next, the cover member 12 will be explained. FIG. 5(A) is a plan view of the cover member 12. And FIG. 5(B) is a side view of the cover member 12 of FIG. 5(A) as seen from the direction B-B'. Moreover, FIG. 5(C) is a sectional view of the cover member 12 of FIG. 5(A) taken in a plane shown by the arrows C-C'. Finally, FIG. 5(D) is a side view of the cover member 12 of FIG. 5(A) as seen from the direction D-D'.

The cover member 12 is made by injection molding, using resin. On this cover member 12, there are provided four pairs of claws 14 through 17, and engagement portions 18 and 19. The cover member 12 is put onto the fitting member 13 from its side to which a mounting portion 25, which will be described hereinafter, faces.

It should be understood that the cover member 12 could also be made from some other material.

The pair of claws 14 consists of two claws 14A and 14B which extend in the same direction. The lengths of the claws 14A and 14B are different. And, since each of the other pairs of claws 15, 16, and 17 has the same structure as the pair of claws 14, detailed explanation thereof will be omitted.

When the cover member 12 is put onto the fitting member 13 from its side to which the mounting portion 25 which will be described hereinafter faces, each of the pairs of claws 14 and 16 squeezes against two contiguous faces of the prism 6. Moreover, each of the pairs of claws 15 and 17 squeezes two contiguous faces of the prism 6. And, at this time, the engagement portions 18 and 19 are engaged with claws provided upon the fitting member 13 which will be described hereinafter. Furthermore, when as described hereinafter the lens array 8 is fitted to the fitting member 13, the prism 6 is positioned to face the unit lens 8B, while the prism 7 is positioned to face the unit lens 8C.

It should be understood that, in an actual implementation, conversely, it would also be acceptable for the engagement portions 18 and 19 to engage with claws which are provided upon the fitting member 13.

Next, the fitting member 13 will be explained. FIG. 6(A) is a rear view of the fitting member 13. And FIG. 6(B) is a side view of the fitting member 13 of FIG. 6(A) as seen from the direction E-E'. Moreover, FIG. 6(C) is a side view of the fitting member 13 of FIG. 6(A) as seen from the direction F-F'. Finally, FIG. 6(D) is an elevation view of the fitting member 13 of FIG. 6(A).

It should be understood that in the following explanation, the surface of the fitting member 13 which faces the light reception element 11 (refer to FIG. 6(A)) will be termed the "holder lower surface". Moreover, the surface of the fitting member 13 which faces away from the light reception element 11 (refer to FIG. 6(D)) will be termed the "holder upper surface".

The fitting member 13 is made by injection molding using resin. The fitting member 13 consists of a prism holder 20, positional determination portions 21 and 22, and claw portions 23 and 24.

It should be understood that the fitting member 13 could also be made from some other type of material.

The prism holder 20 has a circular shape. This prism holder 20 has a mounting portion 25 and opening portions 26 and 27.

As shown in FIG. 6(D), the mounting portion 25 is provided at the central portion of the prism holder 20. Holder stop units 25A through 25F are provided standing up from this mounting portion 25. One end portion of the prism 6 is engaged to the holder stops 25A and 25C of the mounting portion 25, while its other end portion is engaged to the holder stops 25B and 25D. In this manner, the prism 6 is mounted to the mounting portion 25. Moreover, one end portion of the other prism 7 is engaged to the holder stops 25A and 25E of the mounting portion 25, while its other end portion is engaged to the holder stops 25B and 25F.

The opening portions 26 and 27 are shaped as rectangles. These opening portions 26 and 27 are provided in positions which, when the lens array 8 which will be described hereinafter is fitted to the fitting member 13, do not oppose the unit lenses 8A through 8C. Adhesive is applied from the holder upper surface to these opening portions 26 and 27, and thereby the lens array 8 is fitted to the fitting member 13.

As shown in FIG. 6(A), the positional determination portions 21 and 22 are provided so as to stand up upon the holder lower surface. On the positional determination portion 21, there is provided a contacting portion 21A which contacts against the external circumference of the lens array 8, in the state when the lens array 8 is fitted to the holder lower surface. And on the positional determination portion 22, there are provided engagement portions 22A and 22B which engage with the periphery of the lens array 8, in the state in which the lens array 8 is fitted to the holder lower surface.

The claw portions 23 and 24 are provided so as to stand up upon the portions of the external surface of the prism holder 20 where the positional determination portions 21 and 22 are provided. Respective claws 23A and 24A are provided in the central portions of the claw portions 23 and 24. The claw portions 23 and 24 are engaged with the engagement portions 18 and 19, described above, which are provided upon the cover member 12.

It should be understood that the number of the opening portions which are provided to the prism holder 20 is not limited to two; a different number thereof would also be acceptable. Moreover, the shape of these opening portions may also be some shape other than rectangular. Furthermore, the positions of these opening portions need only be positions which do not oppose the plurality of unit lenses provided upon the lens array 8. Yet further, the shape of the prism holder 20 may be some other shape. Even further, although the two prisms 6 and 7 are mounted to a single mounting portion 25, it would also be acceptable to provide two mounting portions, and to mount one of the prisms 6 and 7 to each of these.

Next, the lens array 8 will be explained. FIGS. 7(A) through 7(D) are figures showing this lens array 8. FIG. 7(A) is a rear view of the lens array 8. FIG. 7(B) is a side view thereof as viewed in the direction shown by the arrows C-C' in FIG. 7(A). And FIG. 7(C) is a side view thereof as viewed in the direction shown by the arrows D-D' in FIG. 7(A). Moreover, FIG. 7(D) is an elevation view of this lens array 8.

It should be understood that, in the following explanation, the surface of the lens array 8 which does not face the light reception element 11 will be termed the "lens upper surface", while the surface of the lens array 8 which faces the light reception element 11 will be termed the "lens lower surface".

The lens array 8 consists of a part-circular backing material section 30 and the plurality of unit lenses 8A through 8C.

The backing material section 30 has position determination portions 30A through 30D and groove portions 30E through 30I.

The position determination portions 30A through 30D are provided on the lens lower surface of the backing material section 30. These position determination portions 30A through 30D, which are semi-circular, are provided at four spots which are positioned at the corner portions of the partition wall 9, in the state in which the partition wall 9 is attached to the lens array 8. Moreover, the corner portions of the partition wall 9 engage with and contact their respective ones of the position determination portions 30A through 30D. Due to this, it is possible to perform the determination of the relative position of the lens array 8 and the partition wall 9 in a simple manner. Moreover, by provided the four position determination portions 30A through 30D in four spots, it is possible to prevent positional deviation of the partition wall 9, after the partition wall 9 has been attached to the lens array 8.

The groove portions 30E through 30I are provided upon the lens upper surface. When the -lens array 8 is inserted into the fitting member 13, these groove portions 30E through 30I receive projecting portions not shown in the figures which are provided upon the holder lower surface. By this structure, positional determination when the lens array 8 is inserted into the fitting member 13 becomes simple and easy.

The unit lenses 8A through 8C are fixed at the central portion of the backing material section 30.

It should be understood that the shape of the backing material section may be varied as appropriate. Moreover, the positions and the numbers of the unit lenses may also be varied as appropriate. Yet further, the numbers and the shapes of the position determination portions and the groove portions may also be varied as appropriate. If the number or the shape of the position determination portions is changed, then the number or the shape of the sites upon the partition wall 9, which will be described hereinafter, should be changed to match. Moreover, if the number or the shape of the groove portions is changed, then the number or the shape of the projecting portions which are provided upon the fitting member 13 should be changed to match.

Figure 8:
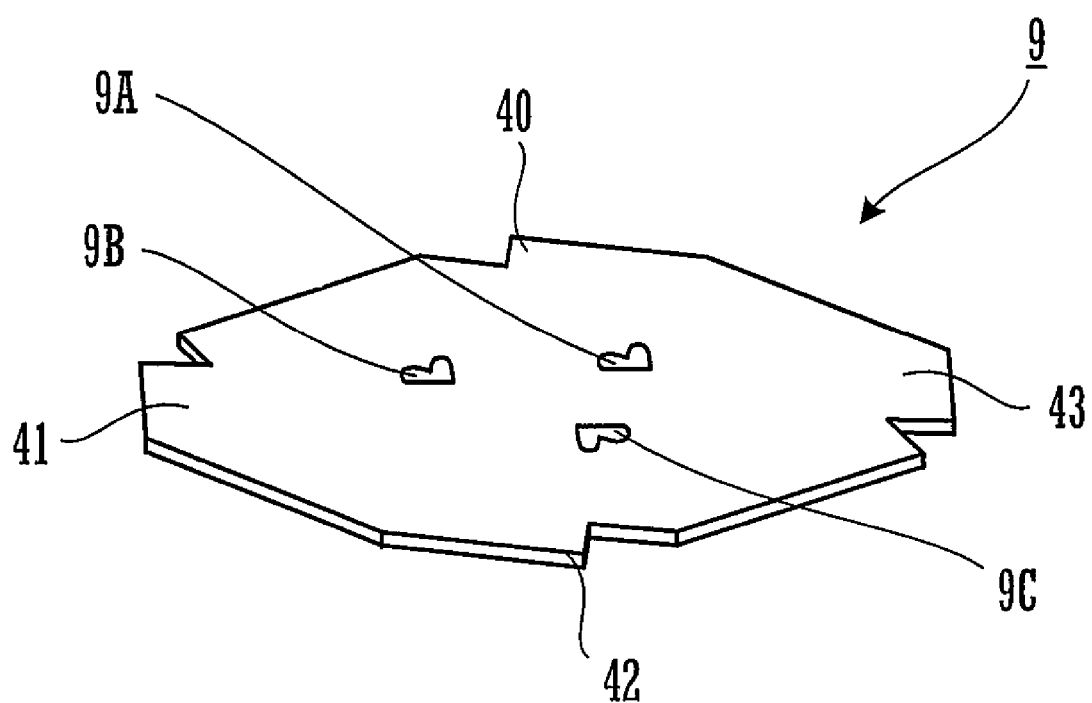
FIG. 8 is a perspective view of a separation member.

Next the partition wall 9 will be explained. FIG. 8 is a perspective view of this partition wall 9.

The partition wall 9 is a hexagonal plate. Opening portions 9A through 9C are provided in the center portion of the partition wall 9. These opening portions 9A through 9C are arranged around a circumference, and are provided at intervals of 120° with respect to the center of the partition wall 9. And these opening portions 9A through 9C are provided in positions which oppose the unit lenses 8A through 8C of the lens array 8. Moreover, the corner portions 40 through 43 of this partition wall 9 are cut out with V-shaped notches, whose two opposing sides intersect at acute angles. In the state in which the partition wall 9 is fitted to the lens array 8, these corner portions 40 through 43 engage with the above described position determination portions 30A through 30D.

It should be understood that the shapes of these notches may be varied as appropriate.

Figure 9:
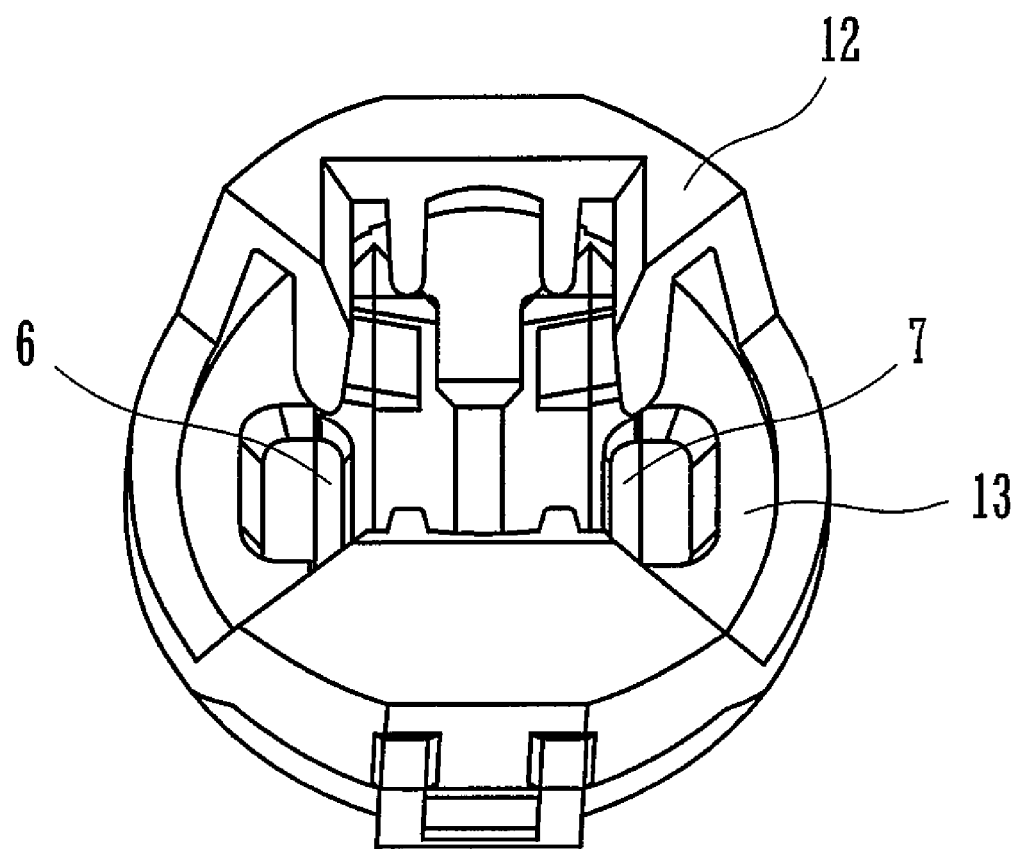
FIG. 9 is a external perspective view showing the prism in its state with the fitting member and the cover member attached.
Figure 10B:
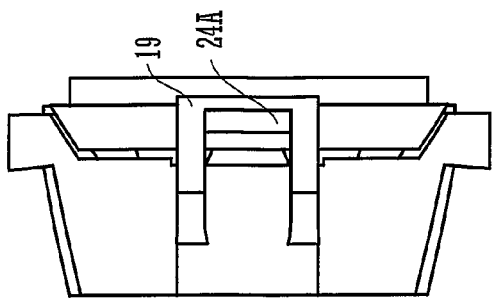
FIGS. 10(A) through 10(D) are an elevation view, side views, and a sectional view of the prism in its state with the fitting member and the cover member attached.
Figure 10C:
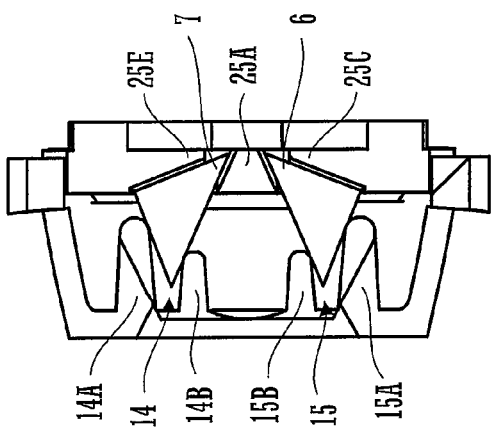
Figure 10D:
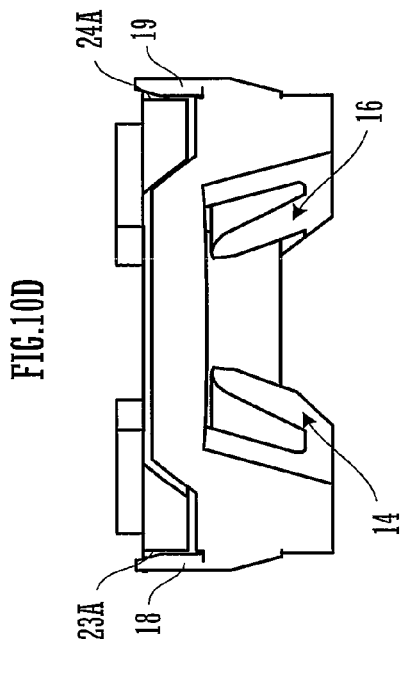
Figure 10A:
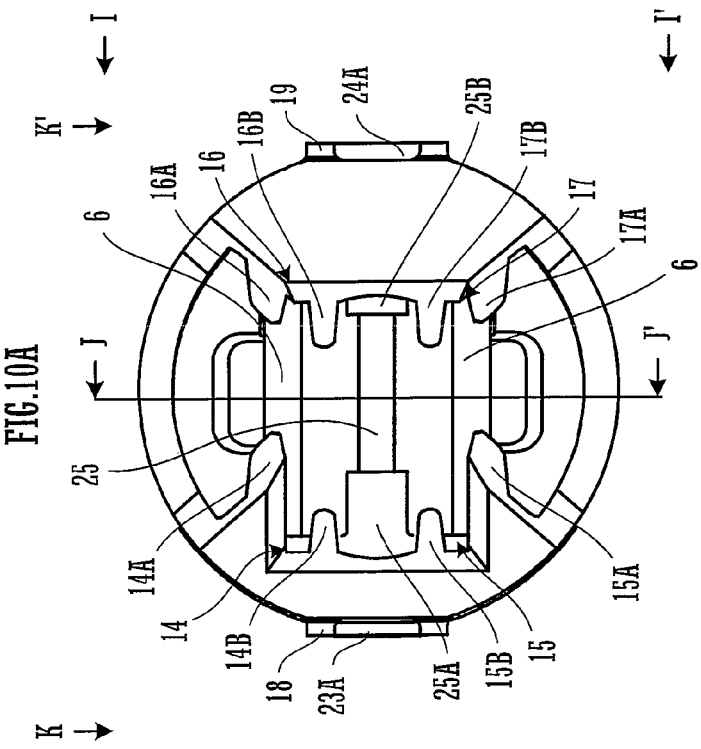
Figure 11:
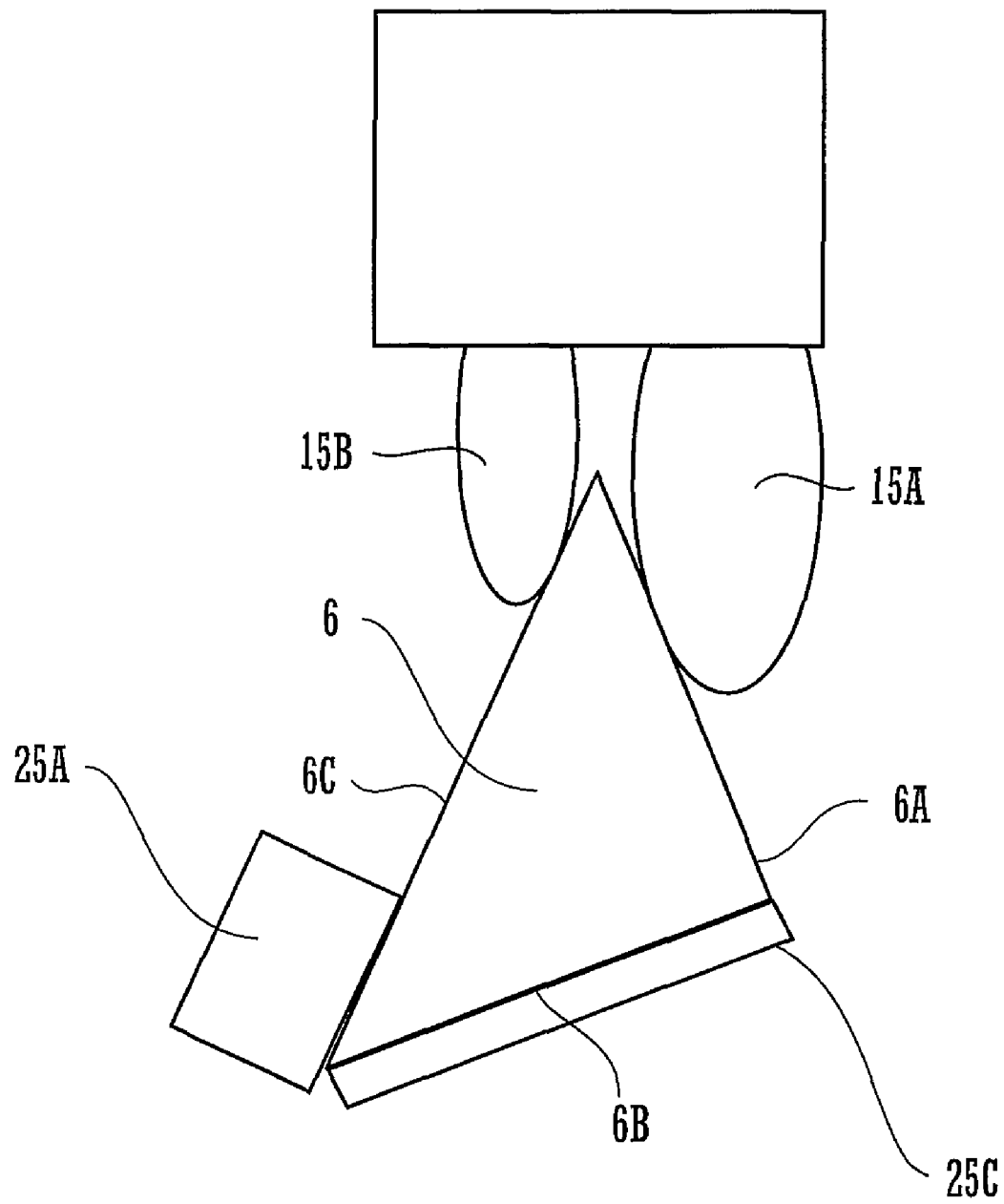
FIG. 11 is a partial enlarged view showing the prism in its state with the fitting member and the cover member attached.

Next, the state in which the cover member 12 is put onto the fitting member 13 to which the prisms 6 and 7 are fitted will be explained. FIG. 9 is an external perspective view showing the state in which the prisms 6 and 7 are fitted to the cover member 12 and the fitting member 13. FIG. 10(A) is an elevation view of FIG. 9. And FIG. 10(B) is a side view of FIG. 10(A) as seen from the direction I-I'. Moreover, FIG. 10(C) is a sectional view of FIG. 10(A) as seen from the direction J-J'. Furthermore, FIG. 10(D) is a side view of FIG. 10(A) as seen from the direction K-K'. Finally, FIG. 11 is a partial enlarged view of the pair of claws 15 and the mounting portion 25 in their state when the prism 6 is mounted.

The prisms 6 and 7 are mounted upon the mounting portion 25 which is provided to the fitting member 13. One end portion of the prism 6 is mounted upon the holder stops 25A and 25C which are provided to the mounting portion 25. Moreover, the other end portion of the prism 6 is mounted to the holder spots 25B and 25D which are provided to the mounting portion 25. And the cover member 12 is put onto the fitting member 13 from its face towards which the mounting portion 25 faces. At this time, as shown in FIG. 11, the emission face 6B of the prism 6 and its reflective surface 6C, i.e. two contiguous faces thereof, are held between the holder stops 25A and 25C. In concrete terms, the holder stop 25A is contacted against the reflective surface 6C of the prism 6, while the holder stop 25C is contacted against the emission face 6B of the prism 6 (refer to FIGS. 6 and 10). Moreover, the reflective surface 6C of the prism 6 and its emission face 6B, which also are two contiguous faces of the prism 6, are held between the holder stops 25B and 25D. In concrete terms, the holder stop 25B is contacted against the reflective surface 6C of the prism 6, while the holder stop 25D is contacted against the emission face 6B of the prism 6 (refer to FIGS. 6 and 10).

And two contiguous faces of the prism 6 are held between the pair of claws 15 and 17. In concrete terms, the claw 15A is contacted against the incident face 6A of the prism 6, while the claw 15B is contacted against the reflective surface 6C. Moreover, the claw 17A is contacted against the incident face 6A of the prism 6, while the claw 17B is contacted against the reflective surface 6C of the prism 6.

Here, the length of the claw 15B which is contacted against that one of the faces, among the two contiguous faces of the prism 6 which are held by the mounting portion 25 and the two contiguous faces of the prism 6 which are held between the pair of claws 15, which is the same as the one contacted against the holder stop 25A, is less than the length of the claw: 15A. Moreover, the length of the claw 17B which is contacted against that one of the faces, among the two contiguous faces of the prism 6 which are held by the mounting portion 25 and the two contiguous faces of the prism 6 which are held between the pair of claws 17, which is the same as the one contacted against the holder stop 25B, is less than the length of the claw 17A. Due to the above, the prism 6 is fixed by the pair of claws 15 and 17 and the mounting portion 25 in a well balanced manner. Moreover, due to the claw 15A being longer than the claw 15B, a balance is struck between the force which is generated by the claw 15B and the holder stop 25A, and the force which is generated by the claw 15A. Furthermore, due to the claw 17A being longer than the claw 17B, a balance is struck between the force which is generated by the claw 17B and the holder stop 25B, and the force which is generated by the claw 17A.

And the prism 7 is fixed by the pair of claws 14 and 16 and the mounting portion 25 in a well balanced manner, just as in the case of the prism. Furthermore, due to the claw 14A being longer than the claw 14B, a balance is struck between the force which is generated by the claw 14B and the holder stop 25A, and the force which is generated by the claw 14A. Moreover, due to the claw 16A being longer than the claw 16B, a balance is struck between the force which is generated by the claw 16B and the holder stop 25B, and the force which is generated by the claw 16A.

It should be understood any shapes are acceptable for the pairs of claws 15 and 17 and of the mounting portion 25, provided that they are shapes which provide a good balance of the vertical components and the horizontal components of the forces which are exerted upon the prism 6.

Moreover, any shapes are acceptable for the pairs of claws 14 and 16 of the mounting portion 25, provided that they are shapes which provide a good balance of the vertical components and the horizontal components of the forces which are exerted upon the prism 7.

Figure 12:
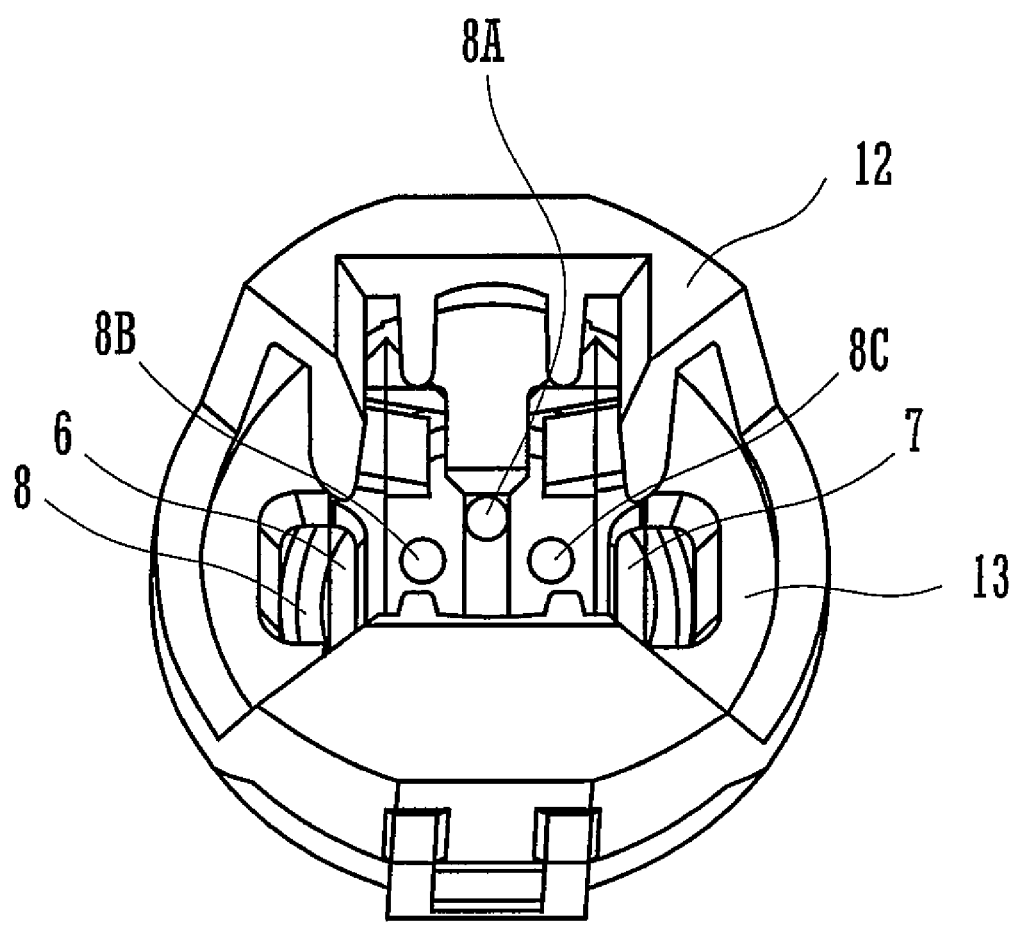
FIG. 12 is an external perspective view showing the prism in its state with the fitting member and the cover member attached, and the lens array in its state with a fitting member attached.

Next, the way in which the lens array 8 is fixed to the holder lower surface of the fitting member 13 will be explained. FIG. 12 is an external perspective view showing the way in which the lens array 8 is fixed to the fitting member 13.

The unit lens 8A is at a position which faces a position where the prisms 6 and 7 are not mounted. Moreover, the unit lens 8B is at a position which faces the position at which the prism 6 is mounted. And the unit lens 8C is at a position which faces the position at which the prism 7 is mounted. In the state in which the lens array 8 is fixed to the fitting member 13, groove portions 30E through 30I engage with projecting portions, not shown in the figures, which are provided upon the holder lower surface. Moreover, in this state, the contacting portion 21A contacts against the circumferential surface of the lens array 8, and the circumferential surface of the position determination portion 22 contacts against the external circumference of the lens array 8. The positional determination of the lens array 8 is performed in this manner. When the positional determination of the lens array 8 has been completed, adhesive is introduced from the holder upper surface through the opening portions 26 and 27. In this manner, the lens array 8 is fixed to the fitting member 13.

By the above, the prisms 6 and 7 and the lens array 8 are fixed to the fitting member 13. Due to this, it is ensured that the lens array 8 and the prisms 6 and 7 move simultaneously, so that positional accuracy of the relative positions of the prisms 6 and 7 and the lens array 8 is obtained in a simple and easy manner.

The separation member 9 is fixed to the lens array 8. This separation member 9 is fitted to the lens lower surface. In concrete terms, in this state, the corner portions 40 through 43 are engaged to the position determination portions 30A through 30D and contact them. By doing this, the separation member 9 is fixed to the lower surface of the lens array 8.

And the IRCF 10 is fitted from the side of this separation member 9 which faces the light reception element 11. This IRCF 10 is fixed to the separation member 9 with adhesive or the like.

With the structure described above, the prisms 6 and 7 are mounted upon the mounting portion 25, and are held between the pairs of claws 14 through 17. Accordingly, the prisms 6 and 7 are fitted with this simple structure, in which the cover member 12 is put onto the fitting member 13. Thus, it is possible to suppress increase of the number of components and increase of the number of manufacturing processes, and thus it is possible to prevent increase of the cost of manufacture.

While, in the embodiment described above, one of the prisms 6 was held between the pairs of claws 15 and 17 which were provided at two locations, it would also be acceptable to provide a structure in which a pair of claws are provided at one location, or in which a number of pairs of claws are provided at a plurality of locations, and in which two contiguous faces of the prisms 6 and 7 are held between these claws.

Moreover, it is desirable for the locations at which the pairs of claws are provided to be positions which face regions upon the light reception element upon which no light rays are projected by the lens array 8. Furthermore, the number of prisms which are mounted to the mounting portion 25 may be one, or may be three or more. In this case, the same number of holder stops should be provided to the mounting portion 25, as the number of prisms.

Yet further, the mounting portions may also be provided in a plurality of locations. In this case, a holder stop should be provided for each mounting portion. Moreover, it is desirable to provide the same number of mounting portions, as the number of prisms.

What is claimed is:

1. An image capturing device, comprising:
   an image capturing unit which captures a plurality of unit images having parallax, by using a prism and a lens array having a plurality of unit lenses;
   a fitting member to which is provided a mounting portion to which said prism is mounted; and
   a cover member which is put onto said fitting member from its side which faces said mounting portion;
   wherein, in the state with said prism mounted, said mounting portion grips two contiguous faces of said prism; and
   said cover member has a pair of claws which, when said cover member is put onto said fitting member, squeeze two contiguous faces of said prism which is mounted upon said mounting portion.

2. An image capturing device according to claim 1, wherein one of said pair of claws is shorter than the other.

3. An image capturing device according to claim 1, wherein: said pair of claws are provided at two spots upon said cover member; and
   when said cover member is put onto said fitting member, said two faces of said prism which is mounted to said mounting portion are gripped at two locations.

4. An image capturing device according to claim 1, wherein: said mounting portions are provided at two locations upon said fitting member; and
   said cover member is provided with one of said pairs of claws for each prism which is mounted to each of said mounting portions at said two locations.

* * * * *